(12) United States Patent
Ru et al.

(10) Patent No.: US 12,206,711 B2
(45) Date of Patent: Jan. 21, 2025

(54) METHOD AND APPARATUS FOR PROCESSING INFORMATION, AND DEVICE AND COMPUTER STORAGE MEDIUM

(71) Applicant: GUANGDONG OPPO MOBILE TELECOMMUNICATIONS CORP., LTD., Guangdong (CN)

(72) Inventors: Zhao Ru, Dongguan (CN); Chaoming Luo, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 261 days.

(21) Appl. No.: 17/991,405

(22) Filed: Nov. 21, 2022

(65) Prior Publication Data
US 2023/0089609 A1  Mar. 23, 2023

Related U.S. Application Data

(63) Continuation of application No. PCT/CN2020/092685, filed on May 27, 2020.

(51) Int. Cl.
H04L 9/40 (2022.01)
H04L 67/146 (2022.01)

(52) U.S. Cl.
CPC ............ *H04L 63/20* (2013.01); *H04L 67/146* (2013.01)

(58) Field of Classification Search
CPC .............................. H04L 63/20; H04L 67/146
USPC ......................................................... 726/14
See application file for complete search history.

(56) References Cited

U.S. PATENT DOCUMENTS

| | | | |
|---|---|---|---|
| 7,716,357 B2 | 5/2010 | Milligan | |
| 8,489,759 B2 | 7/2013 | Parham | |
| 9,680,726 B2 | 6/2017 | Sharma | |
| 9,832,168 B2 | 11/2017 | Kloberdans | |
| 2005/0234873 A1 | 10/2005 | Milligan | |
| 2010/0217782 A1 | 8/2010 | Milligan | |
| 2013/0086380 A1 | 4/2013 | Krishnaswamy | |
| 2014/0244833 A1 | 8/2014 | Sharma et al. | |
| 2016/0006822 A1 | 1/2016 | Kloberdans et al. | |
| 2021/0211509 A1* | 7/2021 | Ly | H04L 41/22 |

(Continued)

FOREIGN PATENT DOCUMENTS

| | | |
|---|---|---|
| CN | 1705947 A | 12/2005 |
| CN | 101431713 A | 5/2009 |
| CN | 101582882 A | 11/2009 |

(Continued)

OTHER PUBLICATIONS

First Office Action of the Chinese application No. 202211476242.9, issued on Apr. 30, 2024, 21 pages with English translation.

(Continued)

*Primary Examiner* — Michael S McNally
(74) *Attorney, Agent, or Firm* — PERKINS COIE LLP

(57) ABSTRACT

An information processing method is provided. The method includes: acquiring first identity information of a first security domain; obtaining first discovery request information on the basis of the first identity information, wherein the first discovery request information is used for requesting a target resource of a target device that matches the first identity information; and sending the first discovery request information.

15 Claims, 11 Drawing Sheets

(56) References Cited

U.S. PATENT DOCUMENTS

| | | | | |
|---|---|---|---|---|
| 2022/0353239 | A1* | 11/2022 | Ru | .................. H04W 40/246 |
| 2023/0007097 | A1 | 1/2023 | Ly et al. | |

FOREIGN PATENT DOCUMENTS

| | | | |
|---|---|---|---|
| CN | 101860474 | A | 10/2010 |
| CN | 103227803 | A | 7/2013 |
| CN | 103650430 | A | 3/2014 |
| CN | 105144636 | A | 12/2015 |
| CN | 105338510 | A | 2/2016 |
| CN | 107196906 | A | 9/2017 |
| CN | 108512870 | A | 9/2018 |
| CN | 108769009 | A | 11/2018 |
| CN | 108769967 | A | 11/2018 |
| CN | 110380963 | A | 10/2019 |
| CN | 110418311 | A | 11/2019 |
| CN | 110516942 | A | 11/2019 |
| CN | 110620817 | A | 12/2019 |
| CN | 110635942 | A | 12/2019 |
| CN | 110717337 | A | 1/2020 |
| CN | 110874804 | A | 3/2020 |
| WO | 2005045563 | A2 | 5/2005 |
| WO | 2019075317 | A1 | 4/2019 |
| WO | 2020029730 | A1 | 2/2020 |

OTHER PUBLICATIONS

First Office Action of the Japanese application No. 2022-572547, issued on May 10, 2024, 8 pages with English translation.

S.Cheshire et al., "DNS-Based Service Discovery", IETF, Feb. 2013, https://datatracker.ietf.org/doc/html/rfc6763, especially Chapter 3-Chapter 4, 49 pages.

"OCF specifications : Introduction and overview of the journal", Open Connectivity Foundation, Jul. 2017, https://openconnectivity.org/wp-content/uploads/2016/01/OCF_1.0_Specification_Overview_JP.pdf, especially refer to pp. 21-29, 165 pages with English translation.

S.Cheshire et al., "Multicast DNS", IETF, Feb. 2013, https://datatracker.ietf.org/doc/html/rfc6762, the whole document, 70 pages.

Z. Shelby, "Constrained RESTful Environments (CoRE) Link Format", IETF, Aug. 2012, https://datatracker.ietf.org/doc/html/rfc6690, the whole document, 22 pages.

Z. Shelby, "The Constrained Application Protocol (CoAP)", IETF, Jun. 2014, https://datatracker.ietf.org/doc/html/rfc7252, the whole document, 112 pages.

Second Office Action of the Chinese application No. 202211476242.9, issued on Jul. 10, 2024, 15 pages with English translation.

Supplementary European Search Report in the European application No. 20937418.0, mailed on Jun. 12, 2023, 6 pages.

Office Action of the Indian application No. 202217070656, issued on Jan. 22, 2024. 6 pages with English translation.

International Search Report in the international application No. PCT/CN2020/092685, mailed on Feb. 20, 2021.

English translation of the Written Opinion of the International Search Authority in the international application No. PCT/CN2020/092685, mailed on Feb. 20, 2021.

* cited by examiner

METHOD AND APPARATUS FOR PROCESSING INFORMATION, AND DEVICE AND COMPUTER STORAGE MEDIUM

CROSS-REFERENCE TO RELATED APPLICATION

The present disclosure is a US continuation application of International Application No. PCT/CN2020/092685 filed on May 27, 2020. The disclosure of the above application is hereby incorporated by reference in its entirety.

RELATED ART

Internet of things (IOT) is an important part of the new generation of information technology. IOT is a network that connects any IOT equipment with the Internet according to the agreed protocol for information exchange and communication, so as to implement the intelligent identification, positioning, tracking, monitoring and management for the equipment.

With the popularization of IOT technology, some IOT devices that need to cooperate with each other often need to perform device discovery and device resource discovery. At present, in the methods for device discovery and device resource discovery that are used in the Internet of things, the first device (such as the client) may transmit the discovery request to multiple second devices (such as the server) in the local area network (LAN), and each second device that receives the discovery request will respond to the discovery request and return its own resource list to the first device.

SUMMARY

The present disclosure relates to the technical field of Internet of things (IOT), in particular to a method and an apparatus for processing information, a device and computer storage medium.

The embodiments of present disclosure provide a method and an apparatus for processing information, a device and computer storage medium.

In the first aspect, the embodiments of present disclosure provide a method for processing information. The method is applicable for a first device. The method includes the following operations.

First identity information of a first security domain is acquired.

First discovery request information is obtained based on the first identity information. The first discovery request information is configured to retrieve a target resource of a target device matching the first identity information.

The first discovery request information is transmitted.

In the second aspect, the embodiments of present disclosure provide a method for processing information. The method is applicable for a second device. The method includes the following operations.

First discovery request information is received. The first discovery request information includes first identity information of a first security domain, and the first discovery request information is configured to retrieve a target resource of a target device matching the first identity information.

Whether to transmit the target resource is determined based on the first identity information.

In the third aspect, the embodiments of present disclosure provide an apparatus for processing information. The apparatus is applicable for a first device. The apparatus includes a first acquiring unit, a first processing unit and a first transceiver unit.

The first acquiring unit is configured to acquire first identity information of a first security domain.

The first processing unit is configured to obtain first discovery request information based on the first identity information. The first discovery request information is configured to retrieve a target resource of a target device matching the first identity information.

The first transceiver unit is configured to transmit the first discovery request information.

In the fourth aspect, the embodiments of present disclosure provide an apparatus for processing information. The apparatus is applicable for a second device. The apparatus includes a second transceiver unit and a second processing unit.

The second transceiver unit is configured to receive first discovery request information. The first discovery request information includes first identity information of a first security domain, and the first discovery request information is configured to retrieve a target resource of a target device matching the first identity information.

The second processing unit is configured to determine whether to transmit the target resource based on the first identity information.

In the fifth aspect, the embodiments of present disclosure provide a device. The device includes a first transceiver, a first processor and a first memory storing a computer program.

The first transceiver, the first processor and the first memory communicate through a first communication bus.

The first processor is configured to implement communication with another device through the first transceiver.

The first processor is further configured to cooperate the first transceiver and execute steps of the method for processing information in the first aspect when running the computer program stored in the first memory.

In the sixth aspect, the embodiments of present disclosure provide a device. The device includes a second transceiver, a second processor and a second memory storing a computer program.

The second transceiver, the second processor and the second memory communicate through a second communication bus.

The second processor is configured to implement communication with another device through the second transceiver.

The second processor is further configured to cooperate the second transceiver and execute steps of the method for processing information in the second aspect when running the computer program stored in the second memory.

In the seventh aspect, the embodiments of present disclosure provide a computer-readable storage medium. A computer program is stored on the computer-readable storage medium. The computer program is executed by the first processor to implement the steps of the method for processing information in the first aspect, or, the computer program is executed by the second processor to implement the steps of the method for processing information in the second aspect.

DETAILED DESCRIPTION

In the prior art, in the methods for device discovery and device resource discovery that are used in the Internet of things, the first device (such as the client) may transmit the discovery request to multiple second devices (such as the server) in the local area network (LAN), and each second device that receives the discovery request will respond to the discovery request and return its own resource list to the first device. In this way, the first device will receive the resource lists returned by multiple second devices, and the received resource lists are likely to include information that the first device does not expect (for example, the resource list returned by the second device that the first device cannot control). Thus, information redundancy is caused and the data processing efficiency of the first device is reduced.

In the method and apparatus for processing information, device and computer storage medium provided by the embodiments of the present disclosure, the first device acquires the first identity information of the first security domain, obtains the first discovery request information based on the first identity information, the first discovery request information being configured to retrieve the target resource of the target device matching the first identity information, and transmits the first discovery request information. That is, the first discovery request information is only used to retrieve the target resource stored in the target device matching the first security domain, so that the information received by the first device is the target resource of the target device matching the first security domain (i.e. the first identity information). In this way, the information redundancy is reduced and the processing efficiency of the first device is improved.

In order to make the purpose, technical scheme and advantages of the application clearer, the embodiments of the present disclosure will be further described in detail below in combination with the accompanying drawings. The attached drawings are for reference and explanation only, and are not used to limit the embodiments of the present disclosure.

It should be noted that the terms "first" and "second" in the description, claims and the above drawings of the present disclosure are used to distinguish different objects, not to describe a specific order. In addition, the terms "comprise", "have" and any deformation thereof are intended to cover non-exclusive inclusion. For example, a process, method, system, product or device containing a series of steps or units is not limited to the listed steps or units, but optionally also includes the steps or units not listed, or optionally includes other steps or units fixed to these processes, methods, products or equipment.

Figure 1:
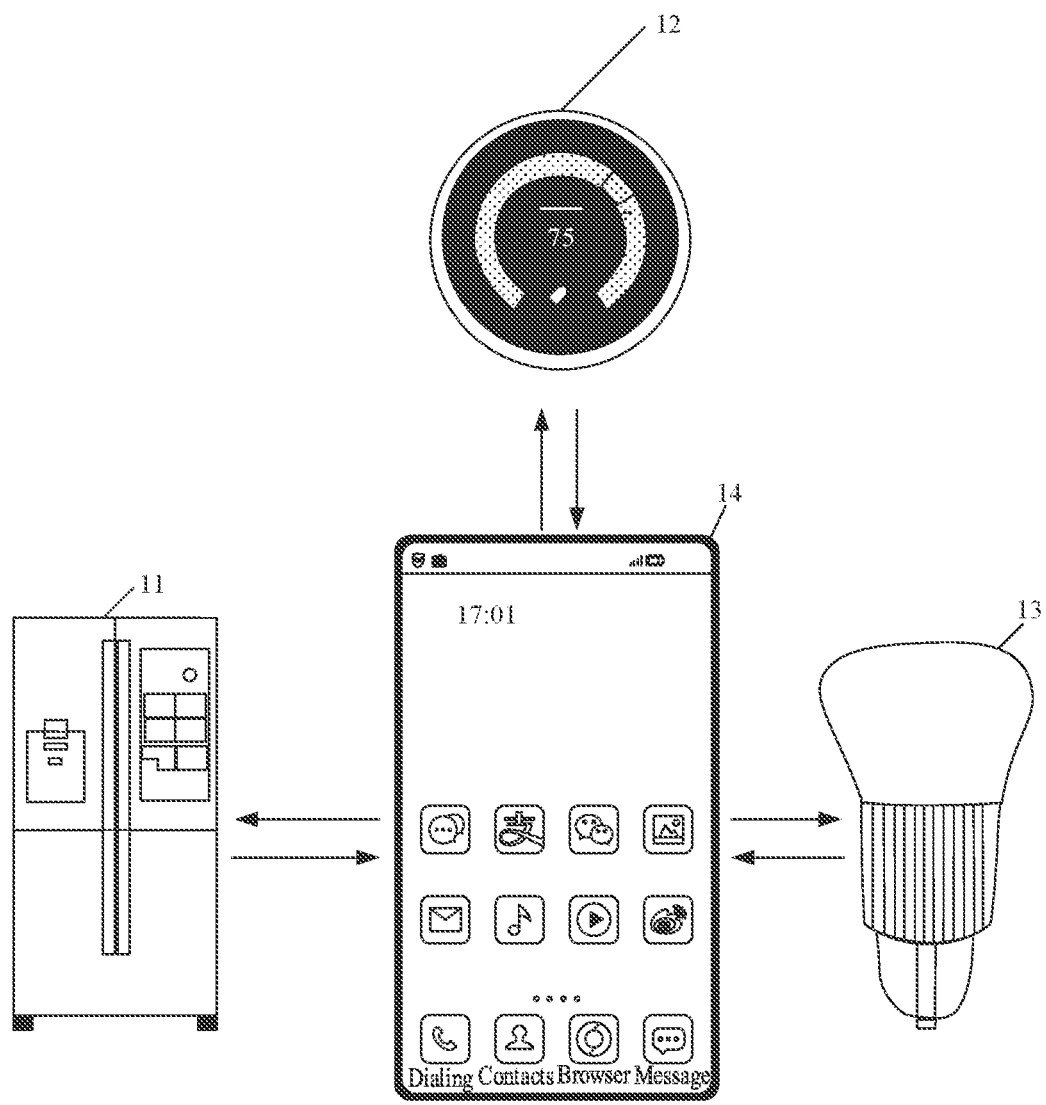
FIG. 1 is a schematic diagram of an application scenario of an exemplary discovery process provided by some embodiments of the present disclosure.

In practical applications, well-known resource (/oic/res resource) may be used as the default discovery mechanism. Referring to the application scenario diagram of the discovery process shown in FIG. 1, the application scenario may include a plurality of server devices (including refrigerator 11, electric lamp 12 and temperature sensor 13 shown in FIG. 1) and a client device (smartphone 14 shown in FIG. 1). The specific discovery process is as follows:

(1) Each server device may update the discoverable resource to the local /oic/res resource of the server. That is, each time a new discoverable resource is instantiated on the server device, the instantiated resource needs to be updated to the local /oic/res resource of the server device.

(2) In order to discover the resources or resource types on multiple server devices, the client device may transmit a RETRIEVE request to the /oic/res resources of multiple server devices. In addition, the client device may use query conditions in the RETRIEVE request to limit the discovered objects, and the query conditions may be limited based on the resource type, interface or attribute.

(3) The server device receiving the RETRIEVE request responds to the request and returns the resource list stored in the /oic/res resource.

That is, the server device that receives the RETRIEVE request needs to respond to the request and return its resource list to the client device. The resource list received by the client device may contain information that the client device does not expect, such as the resource list returned by the server device that is not in the same security domain as the client device, or the resource list returned by the server device that is not controlled by the client device. In this way, information redundancy is caused and the data processing efficiency of client device is reduced.

Figure 2:
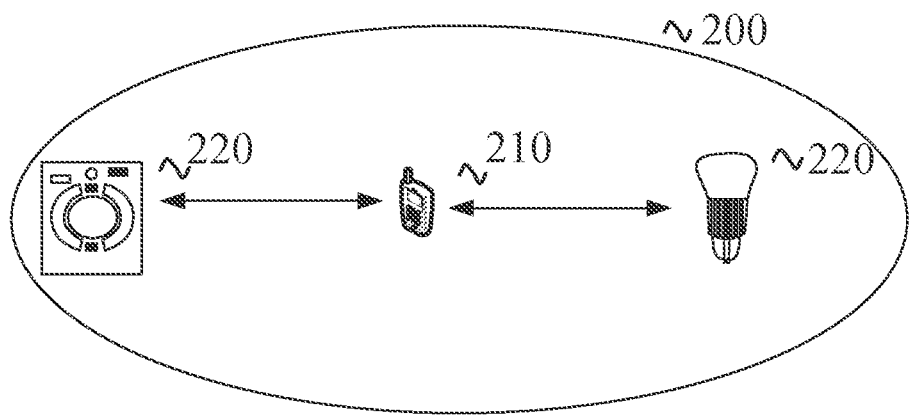
FIG. 2 is a schematic diagram of a network structure provided by some embodiments of the present disclosure.

Based on this, the embodiments of the present disclosure provide a method for processing information, device and computer storage medium. FIG. 2 is a schematic diagram of a network structure 200 applicable for some embodiments of the present disclosure. Referring to FIG. 2, the network structure 200 includes a client device 210 and a server device 220. The client device 210 refers to a device that accesses resources, and the server device refers to a device that provides resources. It should be understood that the client device has the function of querying and controlling other devices, and the server device can be queried and controlled by other devices. That is, in the network structure 200 provided by the embodiments of the present disclosure, any device with the function of querying and controlling other devices can be used as a client device, and any device that can be queried and controlled can be used as a server device. It should be noted that the device that implements the most basic function (such as light bulb) can only be used as the server device and provided to the client device for query and control, and itself has no need of controlling or querying other devices.

The client device 210 and server device 220 involved in the embodiments of the present disclosure include but are not limited to smartphone, tablets, laptops, wearable devices, on-board devices, smart home devices, smart security devices, etc. Smart home device includes but is not limited to smart air conditioner, refrigerator, smart door lock, smart lamps, etc. Smart security device includes but is not limited to smoke and gas alarm device, infrared probe, infrared fence, etc.

FIG. 2 exemplary shows one client device 210 and two server devices 220. In at least one embodiment, the network structure may include a plurality of client devices and other number of server devices, which are not limited by the embodiments of the present disclosure.

It should be understood that the terms "system" and "network" used herein are often used interchangeably. The term "and/or" in the present disclosure is only an association relationship describing the association object, which means that there can be three kinds of relationships, for example, A and/or B can mean that there are three situations: a alone, a and B at the same time, and B alone. In addition, the character "/" in the present disclosure generally means that the front and rear associated objects are an "or" relationship.

Figure 3:
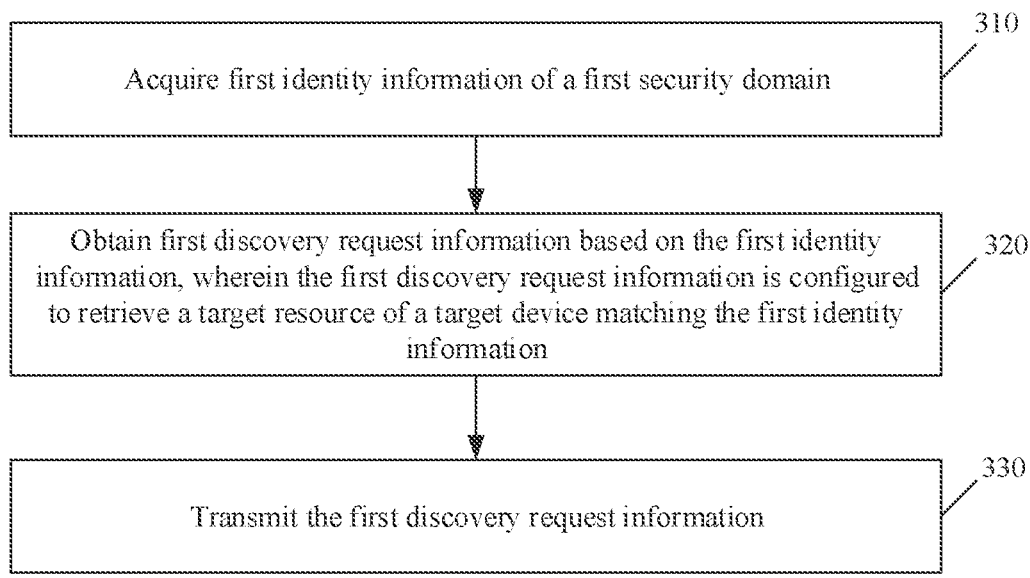
FIG. 3 is the first flow schematic diagram of a method for processing information provided by some embodiments of the present disclosure.

FIG. 3 is a first flow schematic diagram of a method for processing information provided by some embodiments of the present disclosure. The execution body of the method for processing information is the first device, and the first device may be the client device 210 shown in FIG. 2. The method for processing information includes the following contents.

In step 310, a first identity information of a first security domain is acquired.

Here, the security domain may also be called a security domain network. Security domain network is a specific network of the Internet of things (IOT). The security domain network has an independent security protocol (or security mechanism), and the IOT devices in the same security domain network can be interconnected and interworked, and can discover each other, and can transmit instructions mutually. It should be understood that two devices that are not in the same security domain network cannot access the IOT devices in each other's security domain network since they are limited by the security protocol in the security domain network.

Among them, the relevant information of the security domain to which each device belongs may be configured by the user or by other devices (such as the IOT server). The embodiments of the present disclosure are not limited herein.

In some embodiments provided in the present disclosure, the relevant information of the security domain to which the device belongs at least includes the identity information of the security domain. Here, the identity information of the security domain can identify the security domain.

In one possible implementation, the identity information of the security domain may include the identifier information of the security domain and/or the name information of the security domain. It should be understood that in some embodiments of the present disclosure, the first identity information may include the identifier information of the first security domain and/or the name information of the first security domain.

In some embodiments provided in the present disclosure, the first security domain may be the security domain to which the first device belongs. The first security domain may also be any security domain other than the security domain to which the first device belongs. The embodiments of the present disclosure do not limit the first security domain herein.

In step 320, the first discovery request information is obtained based on the first identity information. The first discovery request information is configured to retrieve the target resource of the target device matching the first identity information.

In some embodiments provided in the present disclosure, the first device may construct the first discovery request information based on the first identity information. That is, the first discovery request information carries the first identity information for requesting the target resource stored in the target device matching the first identity information in the network. In this way, the first device adds security domain based filtering condition into the first discovery request information, so that only the device that receives the first discovery request information and the identity information of the security domain matches the first identity information will respond to the first discovery request information, so as to avoid the problem of information redundancy caused by all devices that receive the discovery request information in the network returning the resource list.

It should be noted that in some embodiments of the present disclosure, the first discovery request is used to discover the target resource of the target device matching the first identity information, which may include the following two meanings. Firstly, when the first device accesses the LAN for the first time or starts the device discovery mechanism, the first discovery request is used to discover the target device matching the first identity information in the LAN and the target resource stored in each target device. Secondly, the first device discovers the target resource stored in the known device in the LAN through the first discovery request when the device location in the LAN is known or when the resource discovery mechanism is started. That is, the first discovery request in the embodiments of the present disclosure may be used to implement both device discovery in the network and resource discovery in the network.

In step 330, the first discovery request information is transmitted.

In one possible implementation, the first device may transmit the first discovery request information to at least one second device. Here, the second device may be the server device 220 and the server device 230 shown in FIG. 2.

In one possible implementation, the first device may transmit the first discovery request information to at least one second device by broadcast or multicast. Here, the first device transmits the first discovery request information to at least one second device by broadcast or multicast, which may be executed when the first device firstly accesses the LAN or starts the device discovery mechanism.

In one possible implementation, the first device may also transmit the first discovery request information to at least one second device by unicast. Here, the first device transmits the first discovery request information by unicast, which may be executed when the address of the second device is known.

It can be seen that in the method for processing information provided by the embodiments of the present disclosure, the first device acquires the first identity information of the first security domain. Further, the first discovery request information is obtained based on the first identity information. The first discovery request information is configured to retrieve the target resource of the target device matching the first identity information. The first discovery request information is transmitted. That is, the first discovery request information is only configured to retrieve the target resource stored in the target device matching the first security domain, so that the information received by the first device is the target resource of the target device matching the first security domain (i.e. the first identity information). In this way, the information redundancy is reduced and the processing efficiency of the first device is improved.

Based on the above embodiments, there are many specific implementation methods to acquire the first identity information of the first security domain in step 310. The following describes two implementation methods in detail: mode 1 and mode 2.

Mode 1

In one possible implementation, the implementation process of acquiring the first identity information of the first security domain is as follows.

The identity information of the security domain to which the first device belongs is determined as the first identity information of the first security domain.

It can be understood that the first security domain may be the security domain to which the first device belongs, and the first identity information is the identity information of the security domain to which the first device belongs.

In some embodiments provided in the present disclosure, the first device may view the security domain information stored in the locally configured security domain resource, i.e., the /oic/sec/sdi resource, and find the first identity information in the security domain information. Here, the first identity information may be security domain identifier information and/or security domain name information of the security domain to which the first device belongs.

Further, the first device determines the identity information of the security domain to which the first device belongs as the first identity information of the first security domain, and constructs the first discovery request information. In this way, the first discovery request information is directly constructed by taking the identity information of its own security domain as the first identity information, which may accurately discover the devices. i.e., the devices that can interconnect with the first device, in the same security domain as the first device, so as to improve the discovery efficiency.

Mode 2

In one possible implementation, the implementation process of acquiring the first identity information of the first security domain is as follows.

The setting instruction is acquired. The setting instruction includes identity information of a specific security domain.

The setting instruction is responded, and the identity information of the specific security domain is determined as the first identity information of the first security domain.

In some embodiments provided in the present disclosure, the first device may acquire the setting instruction input by the user through any type of input module, respond to the received setting instruction, and set the identity information of the specific security domain carried in the setting instruction as the first identity information of the first security domain. That is, the first identity information may be the identity information of any security domain input by the user.

It should be noted that the identity information of a specific security domain input by the user may be the security domain identifier information and/or the security domain name information of any security domain.

Further, after determining the first identity information, the first device constructs the first discovery request information based on the first identity information. In this way, the first device may construct the first discovery request information based on the identity information of any security domain input by the user to discover the target information of the target device matching the input security domain, i.e., the information expected by the user. It improves the flexibility of device discovery and resource discovery.

Figure 4:
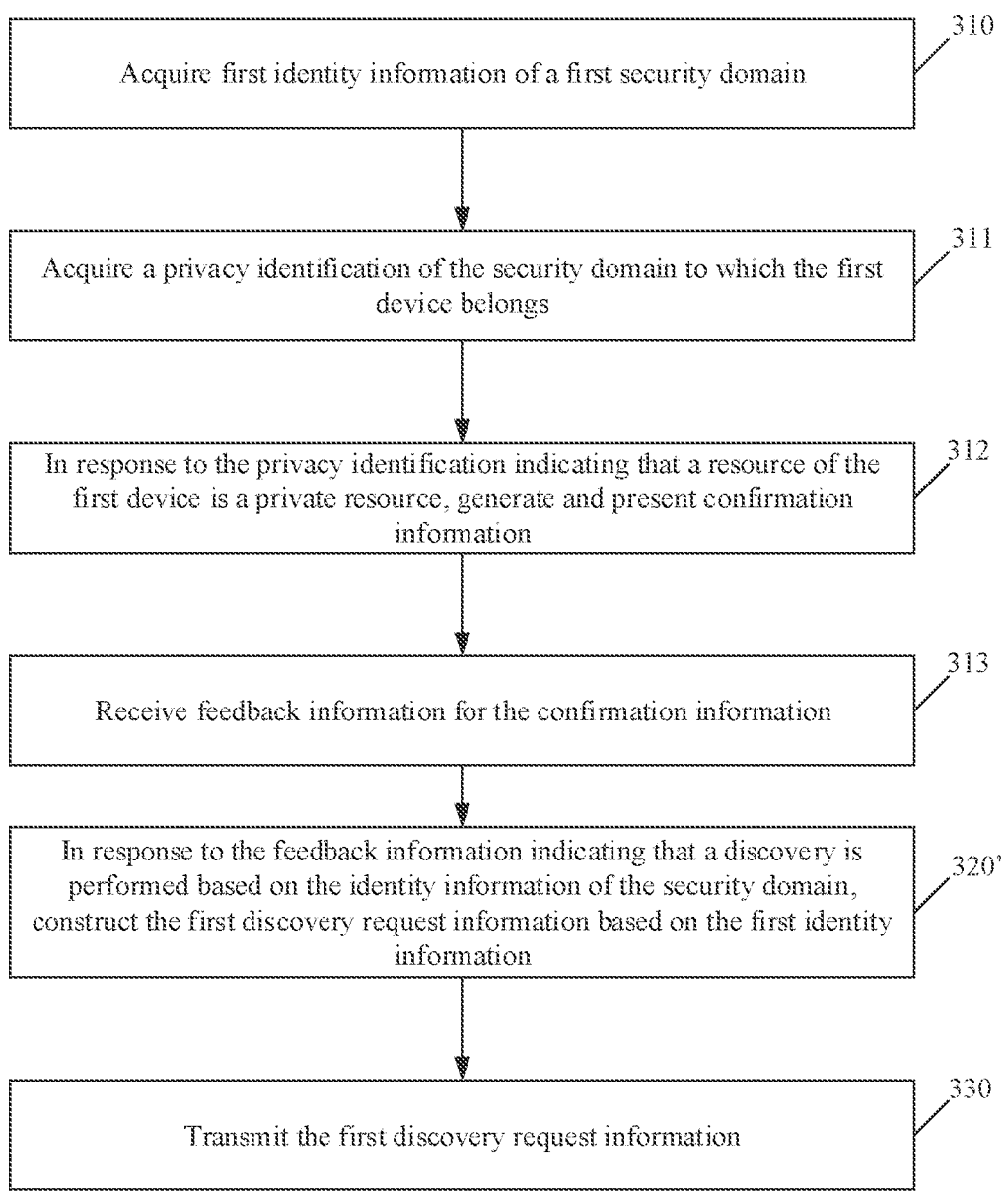
FIG. 4 is the second flow schematic diagram of a method for processing information provided by some embodiments of the present disclosure.

In one possible implementation, as an embodiment, referring to the second flow schematic diagram of a method for processing information shown in FIG. 4, before the step 320 of obtaining the first discovery request information based on the first identity information, the method further includes the following steps.

In step 311, the privacy identification of the security domain to which the first device belongs is acquired.

In Step 312, if the privacy identification indicates that the resource of the first device is a private resource, confirmation information is generated and presented. The confirmation information is configured to confirm whether to perform discovery based on the identity information of the security domain.

In step 313, feedback information for confirmation information is received.

Accordingly, the step 320 of obtaining the first discovery request information based on the first identity information may be implemented through step 320'.

In Step 320', if the feedback information indicates that the discovery is performed based on the identity information of the security domain, the first discovery request information is constructed based on the first identity information.

Here, the security domain information of each device may further include the privacy identification priv. The privacy identification may be used to indicate the visibility of security domain information in the device, or it can be understood as the visibility of security domain resource.

When the privacy identification priv of a device is set to "false", it is considered that the security domain resource of the device is visible. In this way, the security domain information of the device (specifically, the identity information of the security domain) is disclosed in the /oic/res resource of the device. When the privacy identification priv of a device is set to "true", it is considered that the security domain resource of the device is an invisible resource. In this way, the security domain information of the device (specifically, the identity information of the security domain) is not disclosed in the /oic/res resource of the device.

In some embodiments provided by the present disclosure, before the first device performs device discovery or resource discovery, the first device may firstly check whether its privacy identification indicates that the security domain resource of the first device is an invisible resource. When the security domain resource of the first device is an invisible resource, there may be a risk of resource leakage when device discovery and resource discovery is performed. Therefore, when the privacy identification indicates that the resource of the first device is an invisible resource, it is also necessary to confirm with the user whether to perform security domain based discovery.

In one possible implementation, the first device may present confirmation information to the user through the interactive interface of the display device to ask whether to perform device discovery or resource discovery based on the security domain.

Here, after outputting the confirmation information, the first device waits for the feedback information input by the user. If the received feedback information is configured to indicate that a discovery is performed based on the identity information of the security domain, the first discovery request information is obtained based on the first identity information. In this way, the security of data transmission is improved.

It should be noted that steps 311 to 313 may be performed before step 310, or after step 310, or at the same time as step 310. The embodiments of the present disclosure are not limited herein.

In one possible implementation, the step 320 of obtaining the first discovery request information based on the first identity information includes the following operations.

The Uniform Resource Identifier (URI) of the target resource and the request address are acquired.

The first discovery request information is constructed based on the URI of the target resource, the request address and the first identity information.

Here, after determining the first identity information of the first security domain, the first device may determine the request address and the URI corresponding to the requested target resource according to the requirement of device discovery or resource discovery for user. Further, the first discovery request information is constructed according to the URI of the target resource, the request address, and the first identity information.

In one possible implementation, the request address may be a multicast address.

In another possible implementation, the request address may be a unicast address.

Here, the request address may be determined according to the requirement of device discovery or resource discovery for user. If the user needs to request all devices in the LAN, the request address may be a multicast address. When the user knows the address of part of devices and needs to make a request for the resources of this part of the devices, the addresses of this part of the devices may be directly taken as the request address.

The above describes the method for processing information provided by the embodiments of the present disclosure in detail from the perspective of the first device in combination with FIG. 3 and FIG. 4. The following describes the method for processing information provided by the embodiments of the present disclosure in detail from the perspective of the second device in combination with FIG. 5 and FIG. 6. It should be understood that the description of the first device side and the description of the second device side correspond to each other. For similar descriptions, please refer to the above. In order to avoid repetition, it will not be repeated here.

Figure 5:
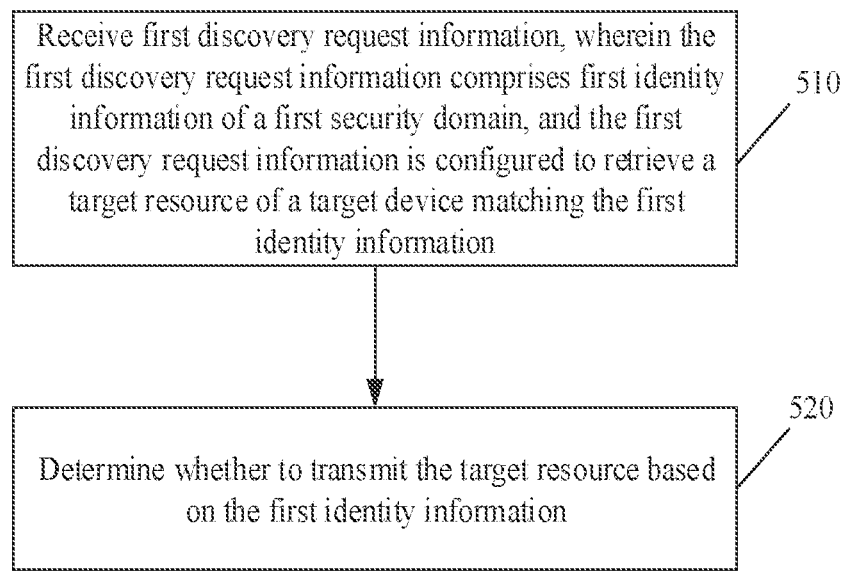
FIG. 5 is the third flow schematic diagram of a method for processing information provided by some embodiments of the present disclosure.

FIG. 5 is the third flow schematic diagram of a method for processing information provided by some embodiments of the present disclosure. The execution body of the method for processing information is the second device, which may be the server device 220 or the server device 230 shown in FIG. 2. The method for processing information includes the following contents.

In step 510, the first discovery request information is received. The first discovery request information includes the first identity information of the first security domain. The first discovery request information is configured to discover the target resource of the target device matching the first identity information.

In one possible implementation, the second device receives the first discovery request information transmitted by the first device.

In another possible implementation, the second device receives the first discovery request information transmitted by the first device forwarded by other devices.

In step 520, whether to transmit the target resource is determined based on the first identity information.

Here, the first discovery request information is configured to retrieve the target resource stored in the target device matching the first identity information. In some embodiments of the present disclosure, after receiving the first discovery request information, the second device may analyze the first identity information of the first security domain from the first discovery request information, and determine whether it matches the first identity information based on the first identity information. If it matches, it will respond to the first discovery request information and determine to transmit its own target resource. If it does not match, it will not respond to the first discovery request information and determine not to transmit its own target resource.

That is, only when the second device matches the first identity information carried in the first discovery request information, the second device can respond to the first discovery request information and return the target resource in the second device, so that the information received by the first device is the target resource of the target device matching with the first security domain (i.e., first identity information). In this way, the information redundancy is reduced and the processing efficiency of the first device is improved.

Figure 6:
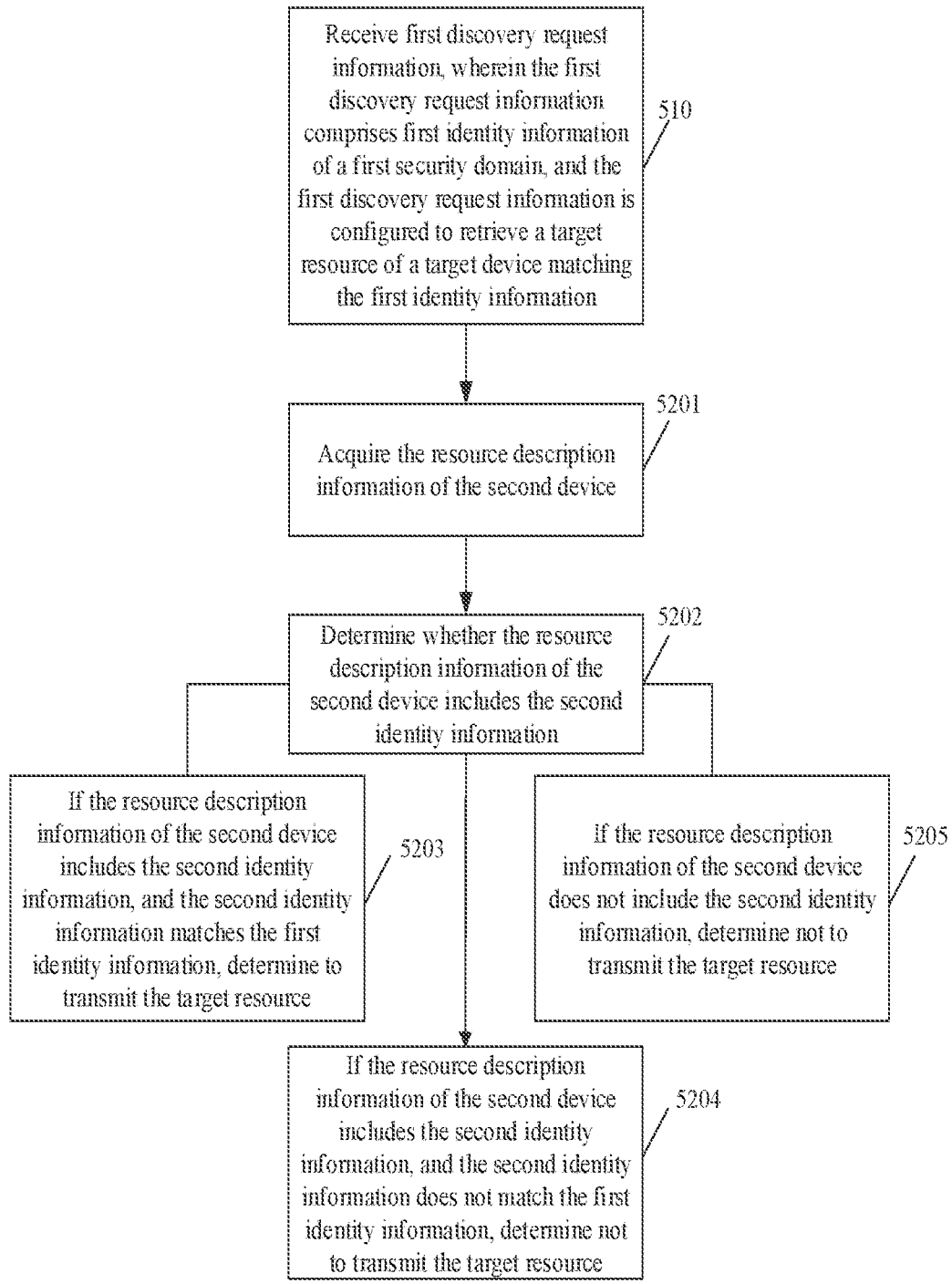
FIG. 6 is the fourth flow schematic diagram of a method for processing information provided by some embodiments of the present disclosure.

In one possible implementation, referring to the fourth flow schematic diagram of a method for processing information shown in FIG. 6, the implementation process of determining whether to transmit the target resource of the second device based on the first identity information is as follows.

In step 5201, the resource description information of the second device is acquired.

In some embodiments provided in the present disclosure, the resource description information of the second device may be attribute information in the /oic/res resource of the second device.

In step 5202, whether the resource description information of the second device includes the second identity information is determined. The second identity information is the identity information of the security domain to which the second device belongs.

It should be understood that determining whether the second identity information matches the first identity information is determining whether the security domain of the second device and the first security domain carried in the first discovery request information are the same security domain.

Here, the second identity information may include identifier information of the security domain to which the second device belongs and/or name information of the security domain to which the second device belongs. In some embodiments provided in the present disclosure, the second device may find the identifier information of the security domain to which the second device belongs and/or the name information of the security domain to which the second device belongs from the attribute information in the /oic/res resource.

It should be noted that when the first identity information is the identifier information of the first security domain, the second device needs to acquire the identifier information of its own security domain to match with the first identity information. When the first identity information is the name information of the first security domain, the second device needs to acquire the name information of the security domain to which the second device belongs to match the first identity information. When the first identity information is the identifier information and name information of the first security domain, the second device needs to acquire the identifier information and name information of the security domain to which the second device belongs to match the first identity information. In this case, it can be determined that the second identity information matches the first identity information only when both the identifier information and name information of the second device match with the identifier information and name information of the first security domain, or it may also be determined that the second identity information matches the first identity information when any one of the identifier information and name information of the second device matches that of the first security domain. The embodiments of the present disclosure are not limited herein.

In step 5203, if the resource description information of the second device includes the second identity information, and the second identity information matches the first identity information, it is determined to transmit the target resource.

Here, if the second identity information matches the first identity information, it can be considered that the security domain of the second device and the security domain of the first device are the same security domain, and the second device responds to the first discovery request information, that is, the second device acquires the target resource to be requested in the first discovery request information and transmits the target resource.

In step 5204, if the resource description information of the second device includes the second identity information, and the second identity information does not match the first identity information, it is determined not to transmit the target resource.

Here, if the second identity information does not match the first identity information, it can be considered that the security domain of the second device and the security domain of the first device are not a same security domain, and the second device does not respond to the first discovery request information, that is, the second device does not transmit the target resource.

In step 5205, if the resource description information of the second device does not include the second identity information, it is determined not to transmit the target resource.

Here, the resource description information of the second device does not include the second identity information, which may be caused by the following two situations. In the first situation, the second device does not implement the security domain resource, or the second device does not configure the security domain information. In the second situation, the privacy identification in the security domain information of the second device is set to "true". In the above two situations, the second device and the first device cannot implement the security domain based device discovery or resource discovery. Therefore, when the resource description information of the second device includes the second identity information, the second device may determine not to respond to the first discovery request information, that is, not to transmit the target resource.

In one possible implementation, after the step 5203 of determining the transmission target resource, the method further includes the following operations.

The second device is determined as the target device and the target resource of the second device is acquired.

The target resource is transmitted to the first device.

Here, after the second device determines that the second identity information matches the first identity information, it can determine that the second device is the target device. After determining the transmission target resource, the second device performs a response to the first discovery request information, that is, the target resource required in the first discovery request information is acquired and the target resource is transmitted to the first device.

In at least one embodiment, the second device transmits the target resource to the first device by unicast.

In view of above, in the method for processing information provided in the present disclosure, when the second device matches the first identity information carried in the first discovery request information, the second device can respond to the first discovery request information and return the target resource in the second device, so that the information received by the first device is the target resource matching with the first security domain (i.e., first identity information). In this way, the information redundancy is reduced and the processing efficiency of the first device is improved.

The method for processing data provided by some embodiments of the disclosure is described in detail below in combination with the actual application scenarios.

Figure 7:
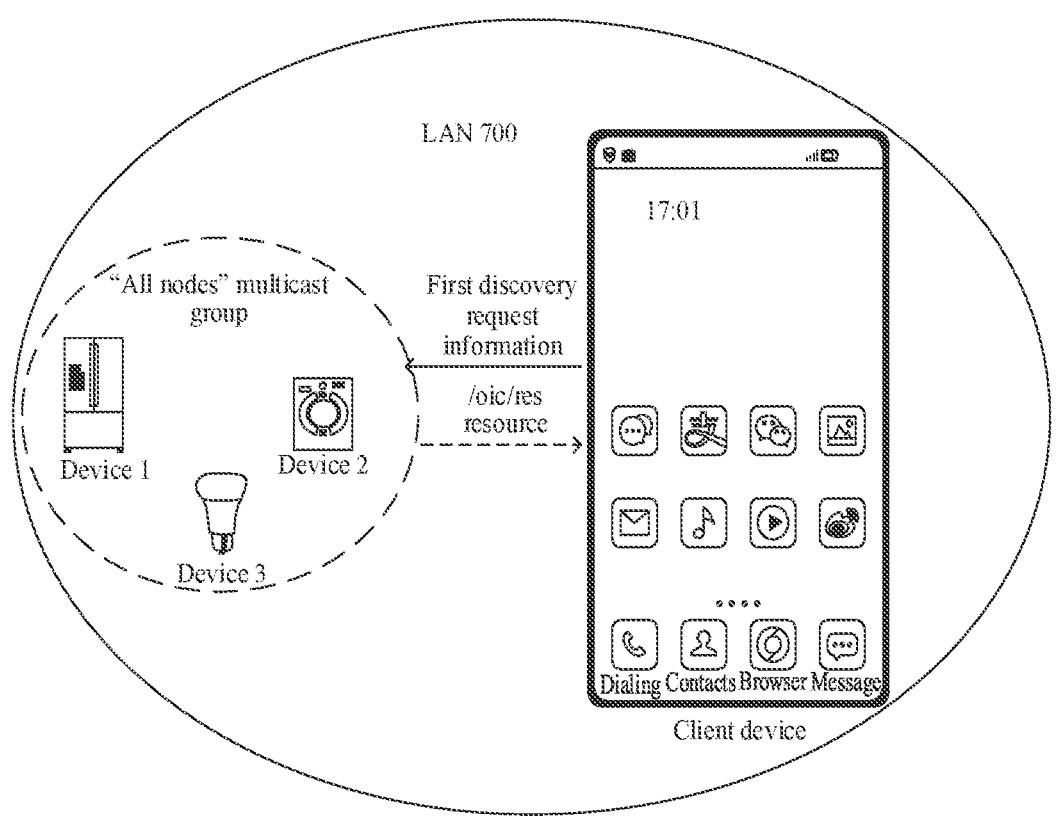
FIG. 7 is a schematic diagram of an application scenario of a method for processing information provided by some embodiments of the present disclosure.

Referring to the application scenario schematic diagram shown in FIG. 7, there are three server devices in LAN 700, namely device 1, device 2 and device 3, and a client device.

The device 1, device 2 and device 3 constitute a multicast group named "all nodes". The multicast addresses of the "all nodes" multicast group include: multicast service address: ff02::158 and port information 5683.

In FIG. 7, device 1 is in the same security domain as the client device, and the security domain information of device 1 is configured to be discoverable (that is, the privacy identification in the security domain information of device 1 sdi.priv=false). An example of the /oic/res resource of device 1 is as follows (ignoring the list of common resources):

```
{
    "rt": ["oic.wk.res"], //Resource type
    "if": ["oic.if.ll", "oic.if.b", "oic.if.baseline"], //Resource interface
    "links": [ //Resource list
        {
            "href": "/light", //Uniform resource identifier parameter
            "anchor": "ocf://11ace64c-2412-4e9f-aa8b-e6128473bb65",//Uniform
resource identifier parameter
```

```
        "rt": [ "oic.r.light"],//Resource type
        "if": [ "oic.if.s", "oic.if.baseline" ] //Resource interface
    }
    ],
    "sduuid": "12345678-1234-1234-1234-123412341234",//Security domain identifier
information
    "sdname": "Alice's Home"//Security domain name information
}
```

The device 2 is not in the same security domain as the client device, and the security domain information of device 2 is configured to be discoverable (that is, the privacy identification in the security domain information of device 2 sdi.priv=false). An example of the /oic/res resource of device 2 is as follows (ignoring the list of common resources):

```
{
    "rt": ["oic.wk.res"], //Resource type
    "if": ["oic.if.ll", "oic.if.b", "oic.if.baseline"], //Resource interface
    "links": [ //Resource list
        {
            "href": "/switch", //Uniform resource identifier parameter
            "anchor":"ocf://0873bc75-3140-49a6-44e6-f74acfa2028c",//Uniform
resource identifier parameter
            "rt": [ "oic.switch.binary" ], //Resource type
            "if": ["oic.if.a", "oic.if.baseline"], //Resource interface
        }
    ],
    "sduuid": "dc70373c-1e8d-4fb3-962e-017eaa863989",//Security domain identifier
information
    "sdname": "Bob's Home"//Security domain name information
}
```

The security domain information of device 3 is configured to be invisible (that is, the privacy identification in the security domain information of device 3 sdi.priv=true). In at least one embodiment, device 3 is not configured with the security domain resource /oic/sec/sdi resource.

Figure 8:
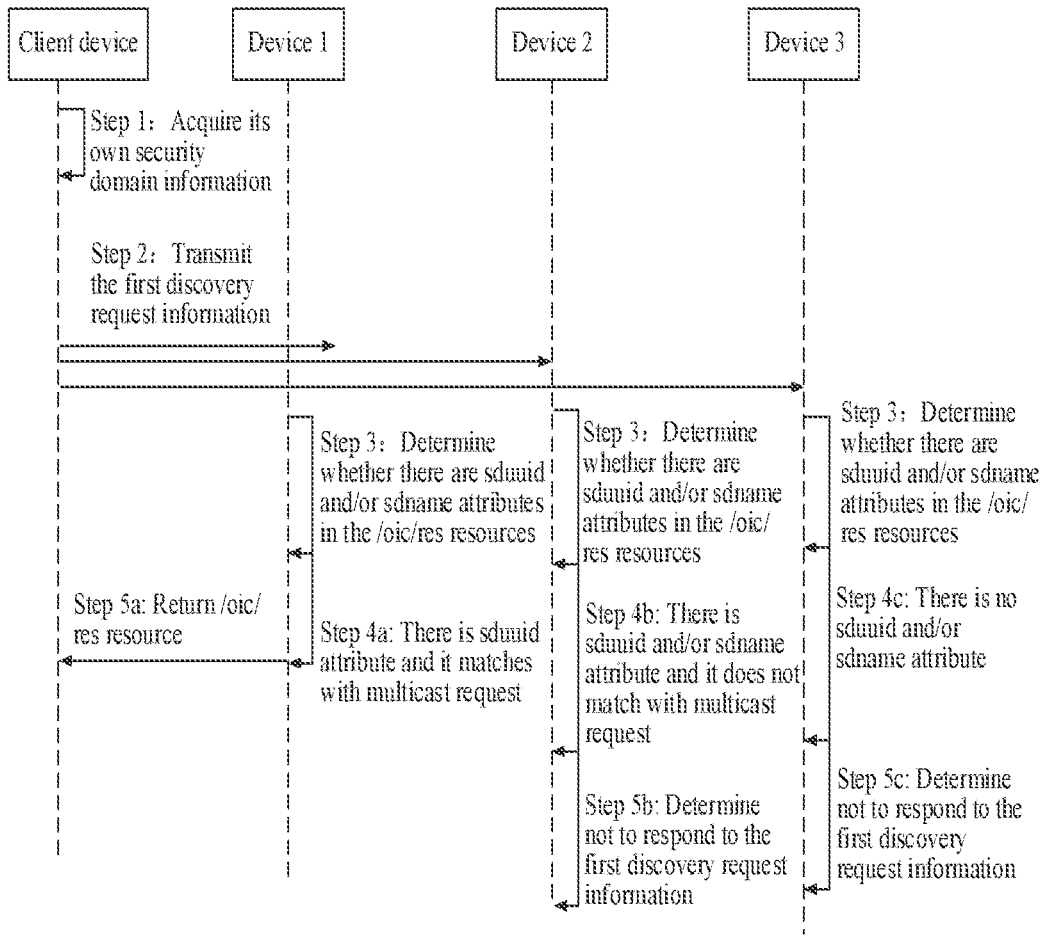
FIG. 8 is a first flow schematic diagram of a device discovery or resource discovery provided by some embodiments of the present disclosure.

Based on the application scenario shown in FIG. 7, in one example, when the client device accesses the LAN 700 for the first time or the client device starts the device discovery mechanism, referring to the first flow schematic diagram of device discovery or resource discovery shown in FIG. 8, the operation flow of the client device (i.e. the first device described above) performing LAN device discovery or resource discovery includes the following steps.

In step 1, the client device (i.e. the first device) views its own security domain information and acquires the identity information of the security domain to which the client device belongs.

In at least one embodiment, the identity information of the security domain to which the client belongs is security domain identifier information (sduuid). For example, the sduuid of the client device is 12345678-1234-1234-1234-123412341234.

In at least one embodiment, the identity information of the security domain to which the client belongs may also be name information of the security domain (sdname). For example, the sdname of the client device is Alice's home.

Alternatively, sduuid and sdname may be used as the identity information of the security domain to which the client belongs simultaneously.

In step 2, the client device (i.e. the first device) constructs the first discovery request information based on the identity information acquired in the first step. The first discovery request information may be transmitted by multicast.

In some embodiments provided in the present disclosure, when the client device needs to perform device discovery, it may join the "all nodes" multicast group shown in FIG. 7. The client device transmits the first discovery request information to all devices in the "all nodes" multicast group by multicast, and the URI of the requested resource is "/oic/res".

In some embodiments provided in the present disclosure, the first discovery request information may be constructed based on the Constrained Application Protocol (CoAP).

Here, taking the sduuid acquired by the client as the identity information of the security domain to which the client belongs as an example, the construction process of the first discovery request information is explained. Specifically, the client device may construct the first discovery request information according to the multicast address ([ff02::158]: 5683), the target resource /oic/res, and the sduuid value of the security domain to which the client device belongs. The first discovery request information may be: RETRIEVE coap://[ff02::158]:5683/oic/res?sduuid="12345678-1234-1234-1234-123412341234".

In step 3, device 1, device 2 and device 3 receive the first discovery request information, analyze the target resource indicated by the first discovery request information (i.e., the /oic/res resource) and the filtering condition (i.e., the identity information of the security domain to which the client device belongs), and then device 1, device 2 and device 3 determine whether there are sduuid and/or sdname attributes (i.e., the second identity information) in the attributes of their own /oic/res resources.

Here, when the first identity information carried in the first discovery request information transmitted by the client device is sduuid, device 1, device 2 and device 3 determine whether their /oic/res resources have sduuid attribute. When the first identity information carried in the first discovery request information transmitted by the client device is sdname, device 1, device 2 and device 3 determine whether their /oic/res resources have sduuid attribute. In addition, when the first identity information carried in the first discovery request information transmitted by the client device is sduuid and sdname, device 1, device 2 and device 3 determine whether their /oic/res resources have sduuid and sdname attributes.

In step 4a, after receiving the first discovery request information, device 1 views the attribute information of its own /oic/res resource and finds that the attribute information includes the sduuid and/or sdname attribute.

The sduuid value of device 1 is "12345678-1234-1234-1234-12341234124", and the sdname value is "Alice's home", which matches the sduuid and/or sdname value in the first discovery request information.

Further, step 5a is performed.

In step 5a, the device 1 returns /oic/res resource to the client device by unicast.

The device 1 returns the resource list "links" in the /oic/res resource, which includes:

```
[
    {
        "href": "/light",//Uniform resource identifier parameter
        "anchor": "ocf://11ace64c-2412-4e9f-aa8b-e6128473bb65",//Uniform resource
identifier parameter
        "rt": [ "oic.r.light"],//Resource type
        "if": [ "oic.if.s", "oic.if.baseline" ] // Resource interface
    }
]
```

In step 4b, after receiving the first discovery request information, device 2 views the attribute information of its/oic/res resource and finds that the attribute information includes sduuid and/or sdname attribute.

The sduuid value of device 2 is "dc70373c-1e8d-4fb3-962e-017eaa863989", and the sdname value is "Bob's home", which does not match the sduuid and/or sdname value in the first discovery request information.

Further, step 5b is performed.

In step 5b, the device 2 determines not to respond to the first discovery request information, that is, not to transmit /oic/res resource.

In step 4c, after receiving the first discovery request information, the device 3 views the attribute information of its /oic/res resource and finds that the attribute information does not include sduuid and/or sdname attribute.

Further, step 5c is performed.

In step 5c, the device 3 determines not to respond to the first discovery request information, that is, not to transmit /oic/res resource.

It should be noted that steps 4a, 4b and 4c may be performed simultaneously.

Further, the client device receives the resource list returned by all discoverable devices in the same security domain as itself in the LAN 700, which may be displayed to the user through the interactive interface for subsequent control. In this way, the information received by the client device is the device resource of the device matching the security domain to which the client belongs. In this way, the information redundancy is reduced and the processing efficiency of client device is improved.

Figure 9:
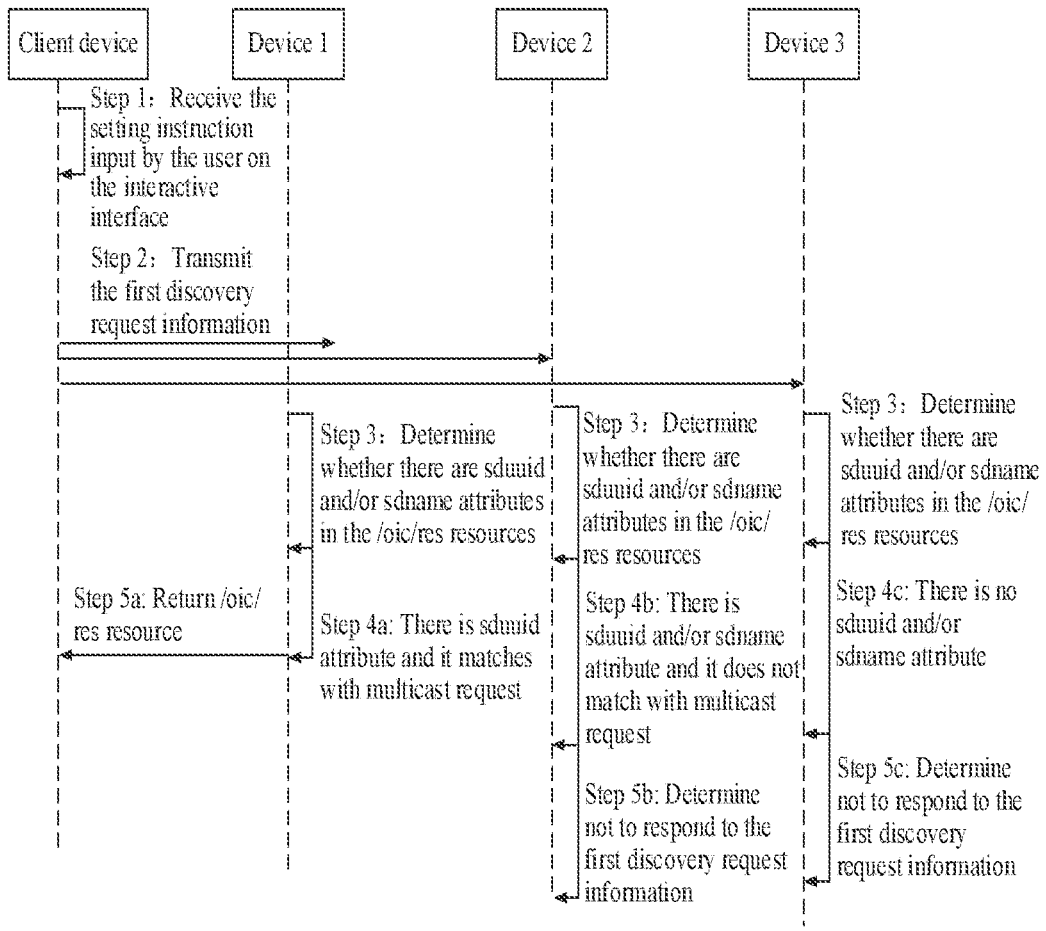
FIG. 9 is a second flow schematic diagram of a device discovery or resource discovery provided by some embodiments of the present disclosure.

Based on the application scenario shown in FIG. 7, in another example, referring to the second flow schematic diagram of the device discovery or resource discovery shown in FIG. 9, the operation flow of the client device (i.e. the first device described above) performing LAN device discovery or resource discovery includes the following steps.

In step 1, the client device receives the setting instruction input by the user on the interactive interface, and the setting instruction is configured to set the first identity information of the first security domain.

It should be understood that users may set the identity information of any security domain as the filtering condition of device discovery. That is, the user may input the identity information of any security domain to form the first discovery request information, and discover the device that is in the same security domain as the security domain through the first discovery request information.

In at least one embodiment, the client device may receive the security domain identifier information input by the user in the interactive interface to construct the first discovery request information. For example, the user inputs the security domain identifier information sduuid as "12345678-1234-1234-123412341234" in the interactive interface of the client device.

In at least one embodiment, the client device may receive the security domain name information input by the user in the interactive interface to construct the first discovery request information. For example, the user inputs the security domain name information as "Alice's home" in the interactive interface of the client device.

In step 2, the client device constructs a first discovery request message based on the first identity information obtained in step 1. The first discovery request information is transmitted in the LAN 700 by multicast.

Here, taking the sdname set by user as "Alice's home" as an example, the construction process of the first discovery request information is explained. Specifically, the client device may construct the first discovery request information according to the multicast address ([ff02::158]:5683), the target resource oic/res, the name information of the security domain to which the client device belongs, and the sdname value. The first discovery request information may be:

RETRIEVE coap://[ff02::158]:5683/oic/res?sdname= "Alice's Home".

In step 3, device 1, device 2 and device 3 receive the first discovery request information, analyze the target resource (i.e. the /oic/res resource) and filtering condition (i.e., the first identity information of the first security domain set by the user), and then device 1, device 2 and device 3 determine whether there are sduuid and/or sdname attributes (i.e., the second identity information) in the attributes of their own /oic/res resources.

In step 4a, after receiving the first discovery request information, device 1 views the attribute information of its own /oic/res resource and finds that the attribute information includes the sduuid and/or sdname attribute.

The sduuid value of device 1 is "12345678-1234-1234-1234-12341234124", and the sdname value is "Alice's home", which matches the sduuid and/or sdname value in the first discovery request information.

Further, step 5a is performed.

In step 5a, the device 1 returns /oic/res resource to the client device by unicast.

The device 1 returns the resource list "links" in the /oic/res resource, which includes:

```
[
  {
    "href": "/light",//Uniform resource identifier parameter
    "anchor": "ocf://11ace64c-2412-4e9f-aa8b-e6128473bb65",//Uniform resource identifier parameter
    "rt": [ "oic.r.light"],//Resource type
    "if": [ "oic.if.s", "oic.if.baseline" ] // Resource interface
  }
]
```

In step 4b, after receiving the first discovery request information, device 2 views the attribute information of its /oic/res resource and finds that the attribute information includes sduuid and/or sdname attribute.

The sduuid value of device 2 is "dc70373c-1e8d-4fb3-962e-017eaa863989", and the sdname value is "Bob's home", which does not match the sduuid and/or sdname value in the first discovery request information.

Further, step 5b is performed.

In step 5b, the device 2 determines not to respond to the first discovery request information, that is, not to transmit /oic/res resource.

In step 4c, after receiving the first discovery request information, the device 3 views the attribute information of its /oic/res resource and finds that the attribute information does not include sduuid and/or sdname attribute.

Further, step 5c is performed.

In step 5c, the device 3 determines not to respond to the first discovery request information, that is, not to transmit /oic/res resource.

It should be noted that steps 4a, 4b and 4c may be performed simultaneously.

Further, the client device receives the resource list returned by all discoverable devices in the same security domain as itself in the LAN 700, which may be displayed to the user for subsequent control. In this way, the information redundancy is reduced and the processing efficiency of client device is improved.

Figure 10:
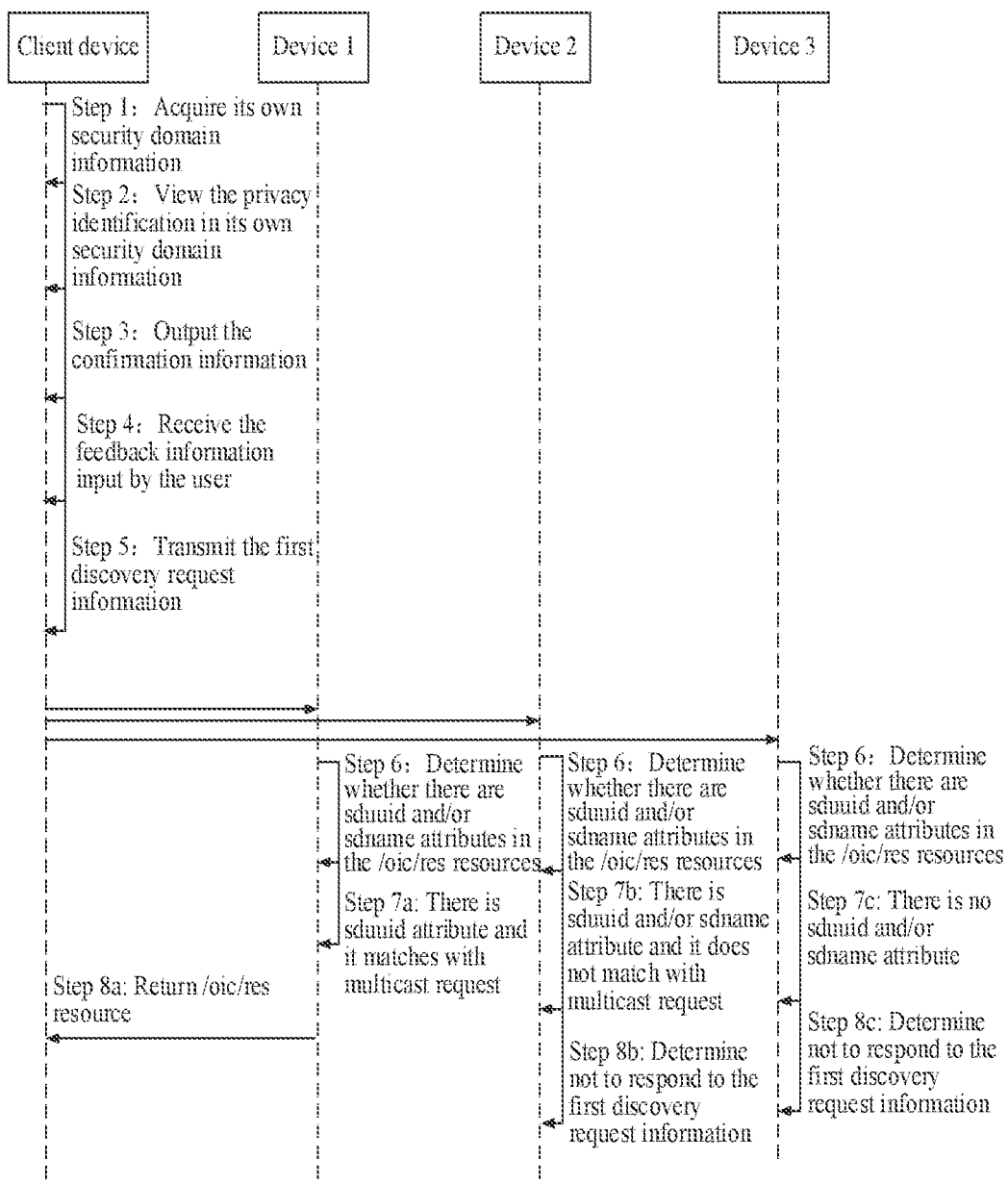
FIG. 10 is a third flow schematic diagram of a device discovery or resource discovery provided by some embodiments of the present disclosure.

Based on the application scenario shown in FIG. 7, in another example, referring to the third flow schematic diagram of the device discovery or resource discovery shown in FIG. 10, the operation flow of the client device (i.e. the first device described above) performing LAN device discovery or resource discovery includes the following steps.

In step 1, the client device (i.e. the first device) views its own security domain information and acquires the identity information of the security domain to which the client device belongs.

In at least one embodiment, the identity information of the security domain to which the client belongs is security domain identifier information (sduuid). For example, the sduuid of the client device is 12345678-1234-1234-1234-123412341234.

In at least one embodiment, the identity information of the security domain to which the client belongs may also be name information of the security domain (sdname). For example, the sdname of the client device is Alice's home.

In at least one embodiment, sduuid and sdname may be simultaneously used as the identity information of the security domain to which the client belongs.

In step 2, the client device views the privacy identification in its own security domain information, that is, the priv attribute value.

In step 3, if the client device shows sdi.priv=true, the confirmation information is generated and presented to the user through the interactive interface of the client device. The confirmation information is used to ask the user whether to perform device discovery and/or resource discovery based on the identity information of the security domain.

In step 4, the client device receives the feedback information input by the user, and the feedback information indicates that the discovery is performed based on the identity information of the security domain.

In step 5, the client device constructs the first discovery request information based on the identity information acquired in step 1. The first discovery request information may be transmitted by multicast.

Here, taking the sduuid acquired by the client as the identity information of the security domain to which the client belongs as an example, the first discovery request information may be: RETRIEVE coap://[ff02::158]:5683/oic/res?sduuid="12345678-1234-1234-1234-123412341234".

In step 6, device 1, device 2 and device 3 receive the first discovery request information, analyze the target resource indicated by the first discovery request information (i.e., the /oic/res resource) and the filtering condition (i.e., the identity information of the security domain to which the client device belongs), and then device 1, device 2 and device 3 determine whether there are sduuid and/or sdname attributes (i.e., the second identity information) in the attributes of their own /oic/res resources.

Here, when the first identity information carried in the first discovery request information transmitted by the client device is sduuid, device 1, device 2 and device 3 determine whether their /oic/res resources have sduuid attribute. When the first identity information carried in the first discovery request information transmitted by the client device is sdname, device 1, device 2 and device 3 determine whether their /oic/res resources have sduuid attribute. In addition, when the first identity information carried in the first discovery request information transmitted by the client device is sduuid and sdname, device 1, device 2 and device 3 determine whether their /oic/res resources have sduuid and sdname attributes.

In step 7a, after receiving the first discovery request information, device 1 views the attribute information of its own /oic/res resource and finds that the attribute information includes the sduuid and/or sdname attribute.

The sduuid value of device 1 is "12345678-1234-1234-1234-12341234124", and the sdname value is "Alice's home", which matches the sduuid and/or sdname value in the first discovery request information.

Further, step 8a is performed.

In step 8a, the device 1 returns /oic/res resource to the client device by unicast.

The device 1 returns the resource list "links" in the /oic/res resource, which includes:

```
[
    {
        "href": "/light",//Uniform resource identifier parameter
        "anchor": "ocf://11ace64c-2412-4e9f-aa8b-e6128473bb65",//Uniform resource identifier parameter
        "rt": [ "oic.r.light"],//Resource type
        "if": [ "oic.if.s", "oic.if.baseline" ] // Resource interface
    }
]
```

In step 7b, after receiving the first discovery request information, device 2 views the attribute information of its /oic/res resource and finds that the attribute information includes sduuid and/or sdname attribute.

The sduuid value of device 2 is "dc70373c-1e8d-4fb3-962e-017eaa863989", and the sdname value is "Bob's home", which does not match the sduuid and/or sdname value in the first discovery request information.

Further, step 8b is performed.

In step 8b, the device 2 determines not to respond to the first discovery request information, that is, not to transmit /oic/res resource.

In step 7c, after receiving the first discovery request information, the device 3 views the attribute information of its /oic/res resource and finds that the attribute information does not include sduuid and/or sdname attribute.

Further, step 8c is performed.

In step 8c, the device 3 determines not to respond to the first discovery request information, that is, not to transmit /oic/res resource.

It should be noted that steps 7a, 7b and 7c may be performed simultaneously.

Further, the client device receives the resource list of returned by all discoverable devices in the same security domain as itself in the LAN 700, which may be displayed to the user for subsequent control. In this way, the information redundancy is reduced and the processing efficiency of client device is improved.

Figure 11:
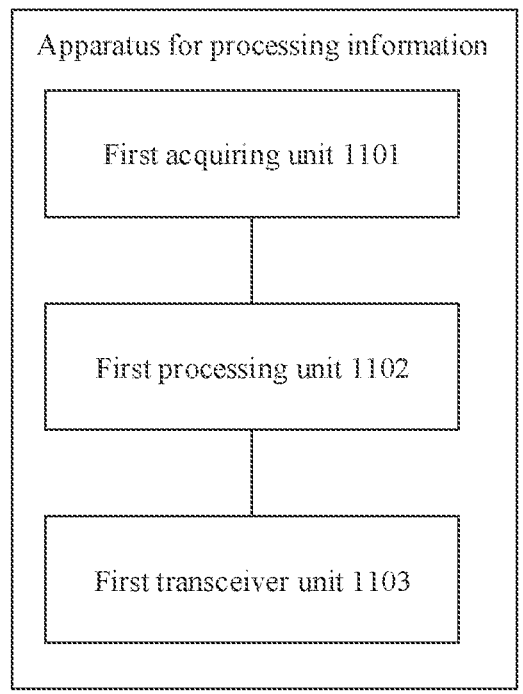
FIG. 11 is a first structural composition diagram of an apparatus for processing information provided by some embodiments of the present disclosure.

Based on the foregoing embodiment, the embodiments of the present disclosure provide an apparatus for processing information, which may be applicable for the first device described above. As shown in FIG. 11, the apparatus for processing information includes a first acquiring unit 1101, a first processing unit 1102 and a first transceiver unit 1103.

The first acquiring unit 1101 is configured to acquire first identity information of a first security domain.

The first processing unit 1102 is configured to obtain first discovery request information based on the first identity information. The first discovery request information is configured to retrieve a target resource of a target device matching the first identity information.

The first transceiver unit 1103 is configured to transmit the first discovery request information.

In some embodiments provided by the present disclosure, the first acquiring unit 1101 is further configured to determine identity information of a security domain to which the first device belongs as the first identity information of the first security domain.

In some embodiments provided by the present disclosure, the first acquiring unit 1101 is configured to acquire a setting instruction. The setting instruction includes identity information of a specific security domain.

The first processing unit 1102 is configured to respond to the setting instruction, and determine the identity information of the specific security domain as the first identity information of the first security domain.

In some embodiments provided by the present disclosure, the first acquiring unit 1101 is configured to acquire a privacy identification of the security domain to which the first device belongs.

The first processing unit 1102 is further configured to generate and present confirmation information if the privacy identification indicates that a resource of the first device is a private resource. The confirmation information is configured to confirm whether to perform discovery based on the identity information of the security domain.

The first transceiver 1103 unit is configured to receive feedback information for the confirmation information.

The first processing unit 1102 is further configured to construct the first discovery request information based on the first identity information if the feedback information indicates that a discovery is performed based on the identity information of the security domain.

In some embodiments provided by the present disclosure, the first transceiver unit 1103 is configured to transmit the first discovery request information to at least one second device.

In some embodiments provided by the present disclosure, the first identity information includes identifier information of the first security domain and/or name information of the first security domain.

In some embodiments provided by the present disclosure, the first acquiring unit 1101 is configured to acquire an URI of the target resource and an request address.

The first processing unit 1102 is further configured to construct the first discovery request information based on the URI of the target resource, the request address, and the first identity information.

In some embodiments provided by the present disclosure, the request address is a multicast address.

Figure 12:
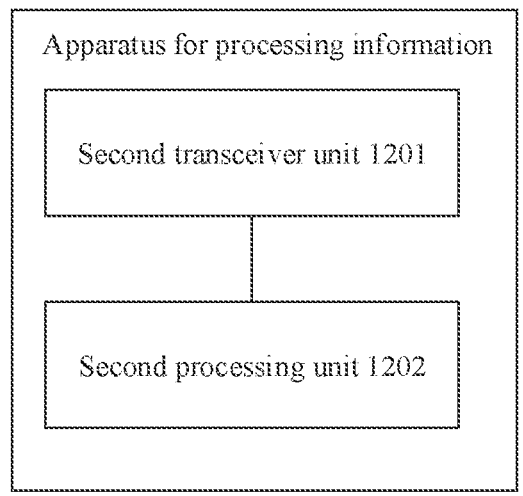
FIG. 12 is a second structural composition diagram of an apparatus for processing information provided by some embodiments of the present disclosure.

Based on the foregoing embodiment, the embodiments of the present disclosure provide an apparatus for processing information, which may be applicable for the second device described above. As shown in FIG. 12, the apparatus for processing information includes a second transceiver unit 1201 and a second processing unit 1202.

The second transceiver unit 1201 is configured to receive first discovery request information. The first discovery request information includes first identity information of a first security domain, and the first discovery request information is configured to retrieve a target resource of a target device matching the first identity information.

The second processing unit 1202 is configured to determine whether to transmit the target resource based on the first identity information.

In some embodiments, the second processing unit 1202 is further configured to determine whether the resource description information includes second identity information, the second identity information being identity information of a security domain to which the second device belongs, and determine to transmit the target resource if the resource description information includes the second identity information and the second identity information matches the first identity information.

In some embodiments, the second processing unit 1202 is further configured to determine not to transmit the target resource if the resource description information includes the second identity information and the second identity information does not match the first identity information.

In some embodiments, the second processing unit 1202 is further configured to determine not to transmit the target resource if the resource description information does not include the second identity information.

In some embodiments, the apparatus for processing information further includes a second acquiring unit.

The second processing unit 1202 is configured to determine the second device as the target device.

The second acquiring unit is configured to acquire the target resource of the second device.

The second transceiver 1201 unit is configured to transmit the target resource to the first device.

Figure 13:
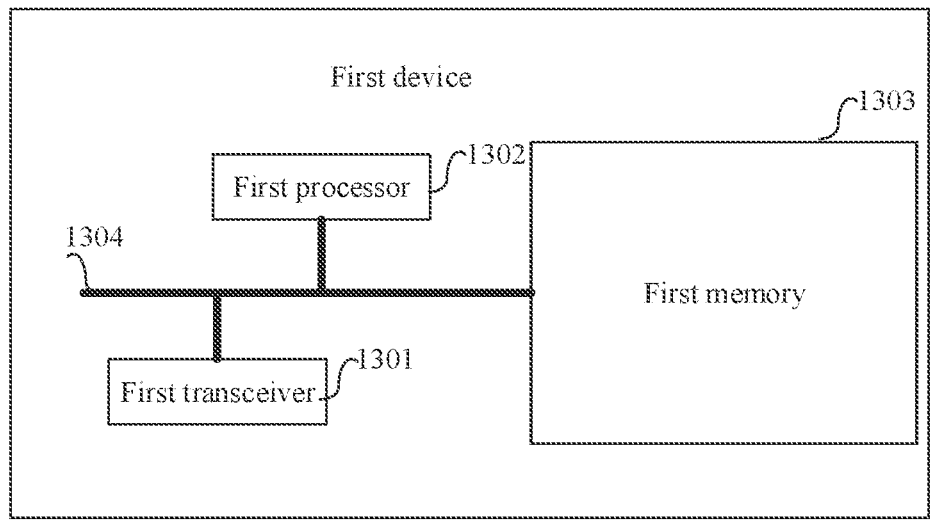
FIG. 13 is a first schematic diagram of the hardware structure of a first device provided by some embodiments of the present disclosure.

Based on the foregoing embodiment, referring to a schematic diagram of the hardware structure of a first device shown in FIG. 13, the embodiments of the present disclosure provide a device. The first device shown in FIG. 13 includes a first transceiver 1301, a first processor 1302 and a first memory storing a computer program 1303.

The first transceiver 1301, the first processor 1302 and the first memory 1303 communicate through a first communication bus 1304.

The first processor is configured to implement communication with another device through the first transceiver 1301.

The first processor 1302 executes the following steps when running the computer program stored in the first memory 1303. A first identity information of a first security domain is acquired. First discovery request information is obtained based on the first identity information. The first discovery request information is configured to retrieve a target resource of a target device matching the first identity information. The first transceiver 1301 executes the following step when running the computer program stored in the first memory 1303. The first discovery request information is transmitted.

In some embodiment, the first processor 1302 executes the following steps when running the computer program stored in the first memory 1303. The identity information of a security domain to which the first device belongs is determined as the first identity information of the first security domain.

In some embodiment, the first processor 1302 executes the following steps when running the computer program stored in the first memory 1303. A setting instruction is acquired. The setting instruction includes identity information of a specific security domain. The setting instruction is responded, and the identity information of the specific security domain is determined as the first identity information of the first security domain.

In some embodiment, the first processor 1302 executes the following steps when running the computer program stored in the first memory 1303. A privacy identification of the security domain to which the first device belongs is acquired. If the privacy identification indicates that a resource of the first device is a private resource, confirmation information is generated and presented. The confirmation information is configured to confirm whether to perform discovery based on the identity information of the security domain. Feedback information for the confirmation information is received. If the feedback information indicates that a discovery is performed based on the identity information of the security domain, the first discovery request information is constructed based on the first identity information.

In some embodiments, the first transceiver 1301 executes the following step when running the computer program stored in the first memory 1303. The first discovery request information is transmitted to at least one second device.

In some embodiments, the first identity information includes identifier information of the first security domain and/or name information of the first security domain.

In some embodiments, the first transceiver 1301 executes the following step when running the computer program stored in the first memory 1303. An Uniform Resource Identifier (URI) of the target resource and an request address are acquired. The first discovery request information is constructed based on the URI of the target resource, the request address, and the first identity information.

In some embodiments, the request address is a multicast address.

Figure 14:
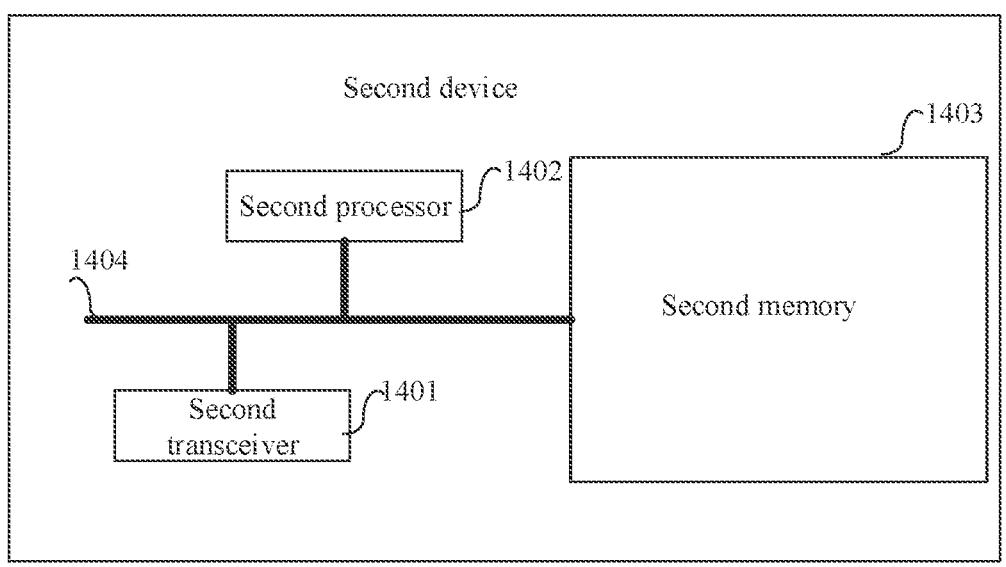
FIG. 14 is a second schematic diagram of the hardware structure of a second device provided by some embodiments of the present disclosure.

Based on the foregoing embodiment, referring to a schematic diagram of the hardware structure of a second device shown in FIG. 14, the embodiments of the present disclosure provide a device. The second device shown in FIG. 14 includes a second transceiver 1401, a second processor 1402 and a first memory storing a computer program 1403.

The second transceiver 1401, the second processor 1402 and the second memory communicate 1403 through a second communication bus 1404.

The second processor 1402 is configured to implement communication with another device through the second transceiver 1401.

The second transceiver 1401 executes the following step when running the computer program stored in the first memory 1403. First discovery request information is received. The first discovery request information includes first identity information of a first security domain, and the first discovery request information is configured to retrieve a target resource of a target device matching the first identity information.

The second processor 1402 executes the following step when running the computer program stored in the first memory 1403. Whether to transmit the target resource is determined based on the first identity information.

In some embodiments, the second processor 1402 executes the following steps when running the computer program stored in the first memory 1403. Resource description information of the second device is acquired. Whether the resource description information includes second identity information is determined. The second identity information is identity information of a security domain to which the second device belongs. If the resource description information includes the second identity information and the second identity information matches the first identity information, the target resource is determined to be transmitted.

In some embodiments, the second processor 1402 executes the following step when running the computer program stored in the first memory 1403. If the resource description information includes the second identity information and the second identity information does not match the first identity information, the target resource is determined not to be transmitted.

In some embodiments, the second processor 1402 executes the following step when running the computer program stored in the first memory 1403. If the resource description information does not include the second identity information, the target resource is determined not to be transmitted.

In some embodiments, the second processor 1402 executes the following step when running the computer program stored in the first memory 1403. The second device is determined as the target device. The target resource of the second device is acquired.

The second transceiver 1401 executes the following step when running the computer program stored in the first memory 1403. The target resource is transmitted to the first device.

It should be understood that the first memory and the second memory in the embodiment may be volatile memory or nonvolatile memory, or may include both volatile and nonvolatile memory. The nonvolatile memory may be Read Only Memory (ROM), Programmable Read-Only Memory (PROM). Erasable Programmable Read-Only Memory (EPROM), Electrically Erasable Programmable Read-Only Memory (EEPROM), Ferromagnetic Random Access Memory (FRAM), Flash Memory, magnetic surface memory, optical disc, or Compact Disc Read-Only Memory (CD-ROM). The magnetic surface memory may be a magnetic disk memory or a magnetic tape memory. The volatile memory may be Random Access Memory (RAM), which is used as an external cache. By way of example but not limitation, many forms of RAM are available, such as Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), SyncLink Dynamic Random Access Memory (SLDRAM), and Direct Rambus Random Access Memory (DRRAM). The memory described in the embodiments of the present disclosure is intended to include, but is not limited to, these and any other suitable types of memory.

The embodiment of the present disclosure also provides a computer storage medium, specifically a computer-readable storage medium. As the first embodiment, when the computer storage medium is located at the terminal and the computer instruction is executed by the processor, any step in the above method for processing information of the embodiments of the present disclosure is implemented.

It should be understood that in various embodiments of the present disclosure, the size of the sequence number of the above processes does not mean the order of execution. The execution order of each process should be determined by its function and internal logic, and should not constitute any limitation on the implementation process of the embodiments of the present disclosure.

Those skilled in the art can realize that the units and algorithm steps of each example described in combination with the embodiments disclosed herein can be implemented by electronic hardware, or a combination of computer software and electronic hardware. Whether these functions are performed in hardware or software depends on the specific application and design constraints of the technical scheme. Professional technicians can use different methods to implement the described functions for each specific application, but such realization should not be considered to be beyond the scope of the present disclosure.

Those skilled in the art can clearly understand that for the convenience and simplicity of description, the specific working process of the above described systems, devices and units can refer to the corresponding process in the above method embodiments, which will not be repeated here.

In several embodiments provided in the present disclosure, it should be understood that the disclosed systems, devices and methods can be implemented in other ways. For example, the device embodiments described above are only schematic. For example, the division of the unit is only a logical function division, and there can be another division mode in actual implementation. For example, multiple units or components can be combined or integrated into another system, or some features can be ignored or not executed. On the other hand, the mutual coupling or direct coupling or communication connection shown or discussed can be indirect coupling or communication connection through some interfaces, devices or units, and can be electrical, mechanical or other forms.

The unit described as a separate component may or may not be physically separated, and the component displayed as a unit may or may not be a physical unit, that is, it may be located in one place or distributed to multiple network units. Some or all of the units can be selected according to the actual needs to achieve the purpose of the embodiments.

In addition, each functional unit in each embodiments of the present disclosure can be integrated into one processing unit, each unit can exist separately, or two or more units can be integrated into one unit.

If the functions are implemented in the form of software functional units and sold or used as independent products, they can be stored in a computer-readable storage medium. Based on this understanding, the technical solution of the application essentially or the part that contributes to the prior art or the part of the technical solution can be embodied in the form of a software product, which is stored in a storage medium, It includes several instructions to enable a computer device (which can be a personal computer, server, network device, etc.) to perform all or part of the steps of the method described in various embodiments of the present application. The aforementioned storage media include: USB flash disk, ROM, RAM, magnetic disc or optical disc and other media that can store program codes.

The above is only the specific embodiments of the present disclosure, but the scope of protection of the present disclosure is not limited to this. Any technician familiar with the technical field can easily think of changes or replacements within the technical scope disclosed in the present disclosure, which should be covered by the scope of protection of the present disclosure. Therefore, the scope of protection of the present disclosure shall be subject to the scope of protection of the claims.

The invention claimed is:

1. A method for processing information, performed by a client device in Internet of things (IOT), comprising:
    determining, by the client device, identity information of a security domain to which the client device belongs as first identity information of a first security domain, the first identity information comprising security domain identifier information, sduuid, of the first security domain, wherein two devices that are not in a same security domain cannot access IOT devices in each other's security domain;

constructing, by the client device, first discovery request information based on the first identity information, wherein the first discovery request information is configured to retrieve a target resource of a target device matching the first identity information, wherein the target device is one of multiple server devices in the IOT and the target resource is an /oic/res resource; and transmitting, by the client device, the first discovery request information to the multiple server devices, wherein the first discovery request information is configured to instruct each server device to acquire resource description information of the server device, determine whether the resource description information comprises second identity information, which is identity information of a security domain to which the server device belongs, and determine to transmit the target resource in response to the resource description information comprising the second identity information and the second identity information matching the first identity information.

2. The method of claim 1, wherein the first identity information further comprises name information of the first security domain.

3. The method of claim 2, wherein the name information of the first security domain is a sdname value of the first security domain.

4. The method of claim 1, wherein constructing, by the client device, the first discovery request information based on the first identity information comprises:

acquiring, by the client device, an Uniform Resource Identifier (URI) of the target resource and an request address; and constructing, by the client device, the first discovery request information based on the URI of the target resource, the request address, and the first identity information.

5. The method of claim 4, wherein the request address is a multicast address or a unicast address.

6. A method for processing information, performed by a server device in Internet of things (IOT), comprising:

receiving, by the server device, first discovery request information from a client device in the IOT, wherein the first discovery request information comprises first identity information of a first security domain, the first identity information comprises security domain identifier information, sduuid, of the first security domain, and two devices that are not in a same security domain cannot access IOT devices in each other's security domain, wherein the first discovery request information is configured to retrieve a target resource of a target device matching the first identity information, the target device is one of multiple server devices in the IOT, and the target resource is an /oic/res resource; and determining, by the server device, whether to respond the first discovery request information based on the first identity information, comprising:

acquiring, by the server device, resource description information of the server device;

determining, by the server device, whether the resource description information comprises second identity information, wherein the second identity information is identity information of a security domain to which the server device belongs; and in response to the resource description information comprising the second identity information and the second identity information matching the first identity information, determining, by the server device, to transmit the target resource.

7. The method of claim 6, further comprising:

in response to the resource description information comprising the second identity information and the second identity information not matching the first identity information, determining, by the server device, not to transmit the target resource.

8. The method of claim 7, wherein a privacy identification in the security domain information of the server device is configured as false.

9. The method of claim 6, further comprising:

in response to the resource description information not comprising the second identity information, determining, by the server device, not to transmit the target resource.

10. The method of claim 9, wherein a privacy identification in the security domain information of the server device is configured as true.

11. A client device in Internet of things (IOT), comprising a first transceiver, a first processor and a first memory storing a computer program;

wherein the first transceiver, the first processor and the first memory communicate through a first communication bus;

wherein the first processor is configured to implement communication with another device through the first transceiver; and the first processor is further configured to:

when running the computer program stored in the first memory, cooperate the first transceiver and execute operations comprising:

determining identity information of a security domain to which the client device belongs as first identity information of a first security domain, the first identity information comprising security domain identifier information, sduuid, of the first security domain, wherein two devices that are not in a same security domain cannot access IOT devices in each other's security domain;

constructing first discovery request information based on the first identity information, wherein the first discovery request information is configured to retrieve a target resource of a target device matching the first identity information, wherein the target device is one of multiple server devices in the IOT and the target resource is an /oic/res resource; and transmitting the first discovery request information to the multiple server devices, wherein the first discovery request information is configured to instruct each server device to acquire resource description information of the server device, determine whether the resource description information comprises second identity information, which is identity information of a security domain to which the server device belongs, and determine to transmit the target resource in response to the resource description information comprising the second identity information and the second identity information matching the first identity information.

12. The device of claim 11, wherein the first identity information further comprises name information of the first security domain.

13. The device of claim 12, wherein the name information of the first security domain is a sdname value of the first security domain.

14. The device of claim 11, wherein constructing the first discovery request information based on the first identity information comprises:
- acquiring an Uniform Resource Identifier (URI) of the target resource and an request address; and
- constructing the first discovery request information based on the URI of the target resource, the request address, and the first identity information.

15. The device of claim 14, wherein the request address is a multicast address or a unicast address.

\* \* \* \* \*